(12) United States Patent
Pavani Filho et al.

(10) Patent No.: US 6,876,141 B2
(45) Date of Patent: Apr. 5, 2005

(54) ELECTRON EMITTER STRUCTURE FOR FIELD EMISSION DISPLAY

(75) Inventors: Aristides Pavani Filho, Campinas (BR); Victor Pellegrini Mammana, São Paulo (BR); Francisco Tadeu Degasperi, São Paulo (BR)

(73) Assignee: Centro de Pesquisas Renato Archer -- CenPRA, Campinas (BR)

( * ) Notice: Subject to any disclaimer, the term of this patent is extended or adjusted under 35 U.S.C. 154(b) by 4 days.

(21) Appl. No.: 10/257,475

(22) PCT Filed: Apr. 11, 2001

(86) PCT No.: PCT/BR01/00046

§ 371 (c)(1), (2), (4) Date: Apr. 21, 2003

(87) PCT Pub. No.: WO01/80273

PCT Pub. Date: Oct. 25, 2001

(65) Prior Publication Data

US 2003/0160555 A1 Aug. 28, 2003

(30) Foreign Application Priority Data

Apr. 13, 2000 (BR) .............................................. 0001211
Apr. 4, 2001 (BR) .............................................. 0001211

(51) Int. Cl.[7] ................................................. H01J 7/18
(52) U.S. Cl. ...................... 313/495; 313/496; 313/549; 313/309
(58) Field of Search ................................ 313/495, 496, 313/549, 309

(56) References Cited

U.S. PATENT DOCUMENTS

| 3,665,241 A | 5/1972 | Spindt et al. |
| 3,789,471 A | 2/1974 | Spindt et al. |
| 5,243,252 A | 9/1993 | Kaneko et al. |
| 5,498,925 A | * 3/1996 | Bell et al. .................. 313/497 |
| 5,763,998 A | 6/1998 | Colombo et al. |
| 6,013,974 A | 1/2000 | Haven et al. |
| 6,097,138 A | 8/2000 | Nakamoto |

FOREIGN PATENT DOCUMENTS

| EP | 0 434 001 A3 | 6/1991 |
| JP | 10-149760 A | 6/1998 |
| JP | 2000-195443 | * 7/2000 |

* cited by examiner

Primary Examiner—David Vu
(74) Attorney, Agent, or Firm—Jacobson Holman PLLC

(57) ABSTRACT

Electron emitter structure for field emission display, a tabular vacuum chamber confined between a rigid transparent front plate and a substantially flat electron emitting structure including a plurality of emitting elements, the residual contaminant gas molecules being removed by transversal pumping through a plurality of pores spread out on the electron emitting structure in order to reach a layer of getter material uniformly distributed over the display area. The emitting elements may be provided by Spindt emitters, sharp or serrated metallic edges or carbon nanotubes. The electron emitting structure includes upper and lower metallic layers plated over the upper and lower surfaces of an insulating plate, the latter consisting of a photo-etchable or plasma-etchable material, such as polyimide or SU8.

23 Claims, 7 Drawing Sheets

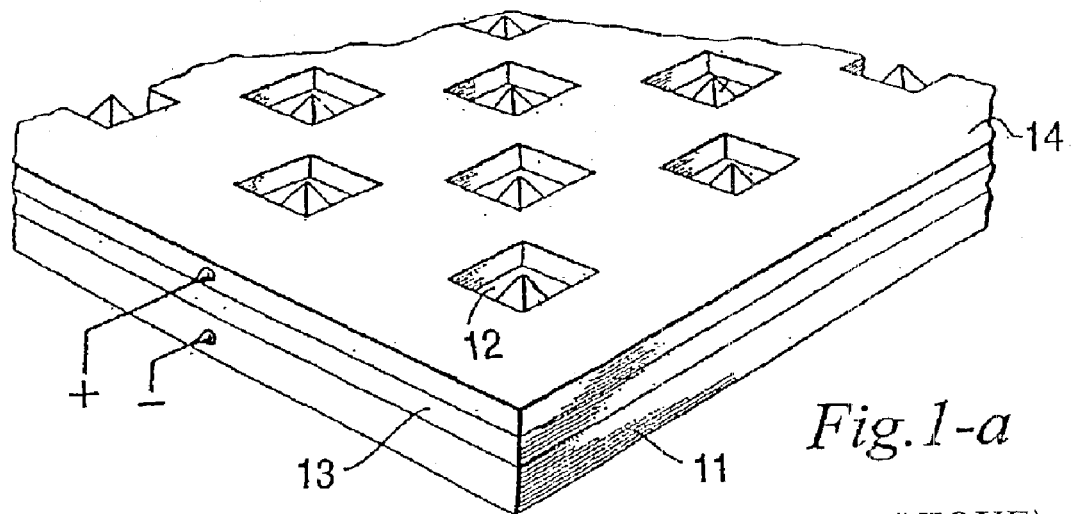
*Fig.1-a*
(PREVIOUS TECHNIQUE)
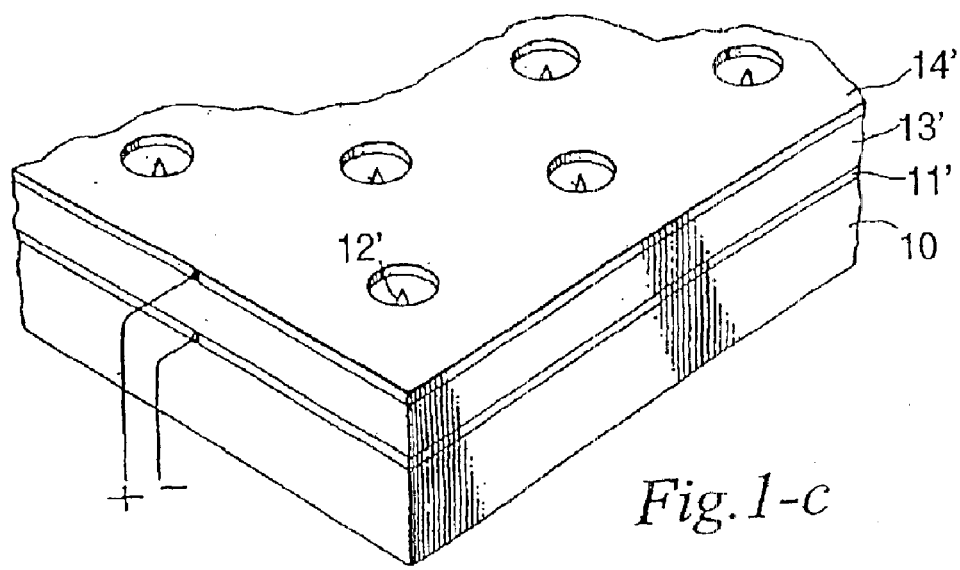
*Fig.1-c*
(PREVIOUS TECHNIQUE)

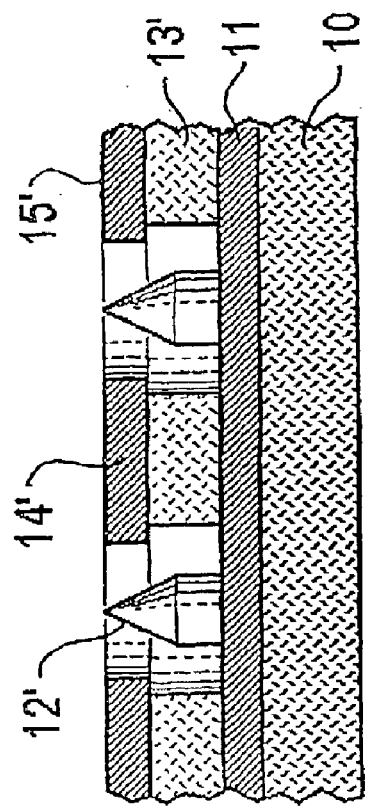
Fig.1-d
(PREVIOUS TECHNIQUE)
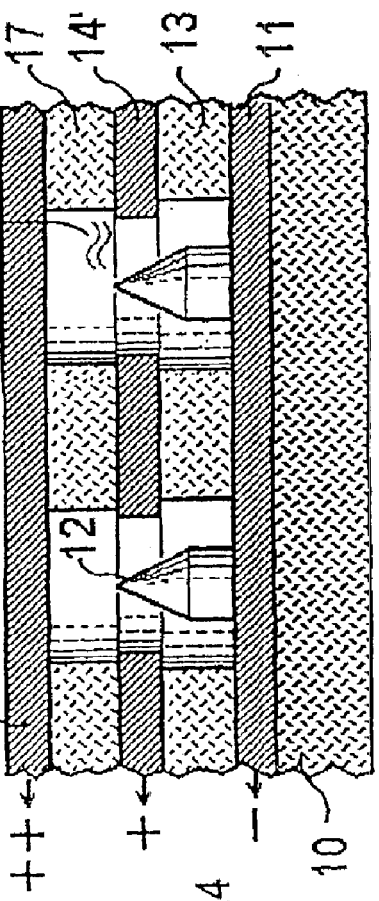
Fig.1-e
(PREVIOUS TECHNIQUE)
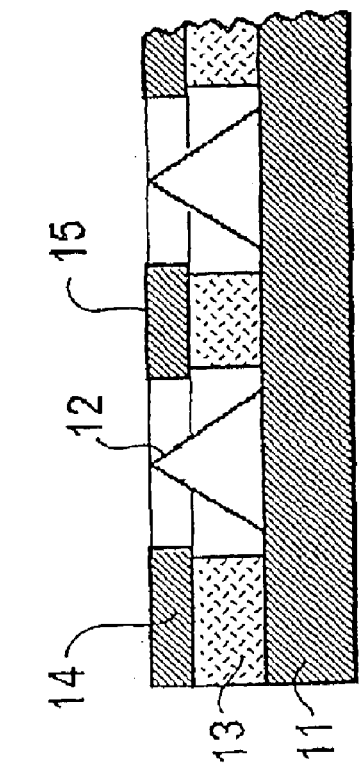
Fig.1-b
(PREVIOUS TECHNIQUE)
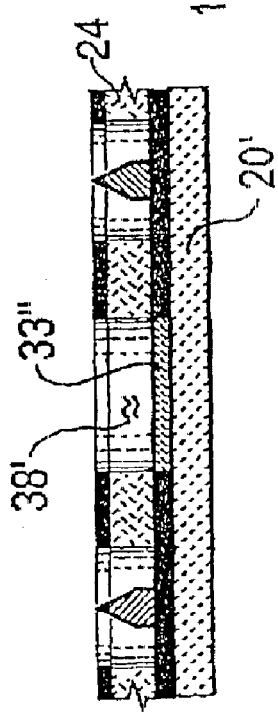
Fig. 8

(PREVIOUS TECHNIQUE)

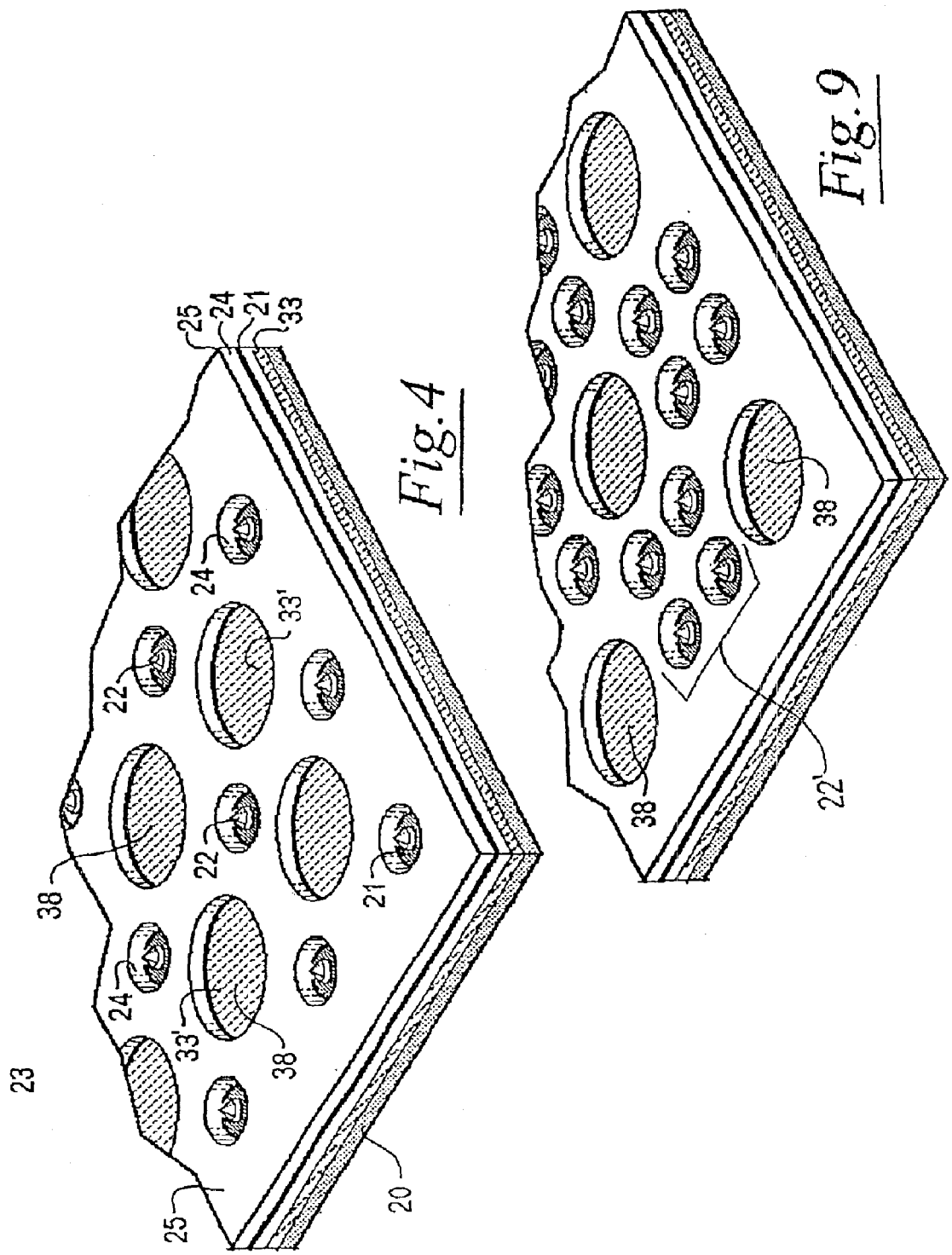

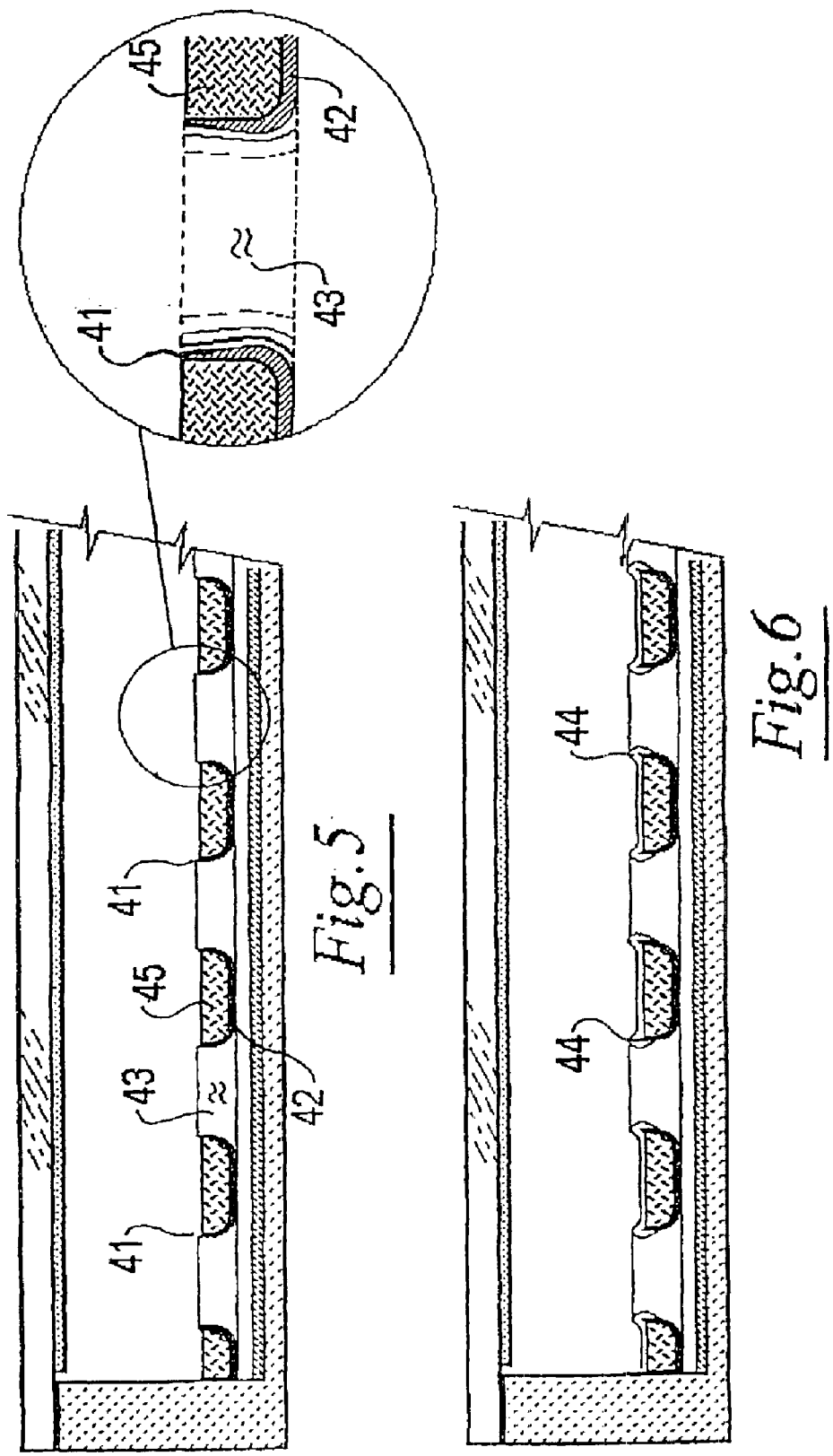

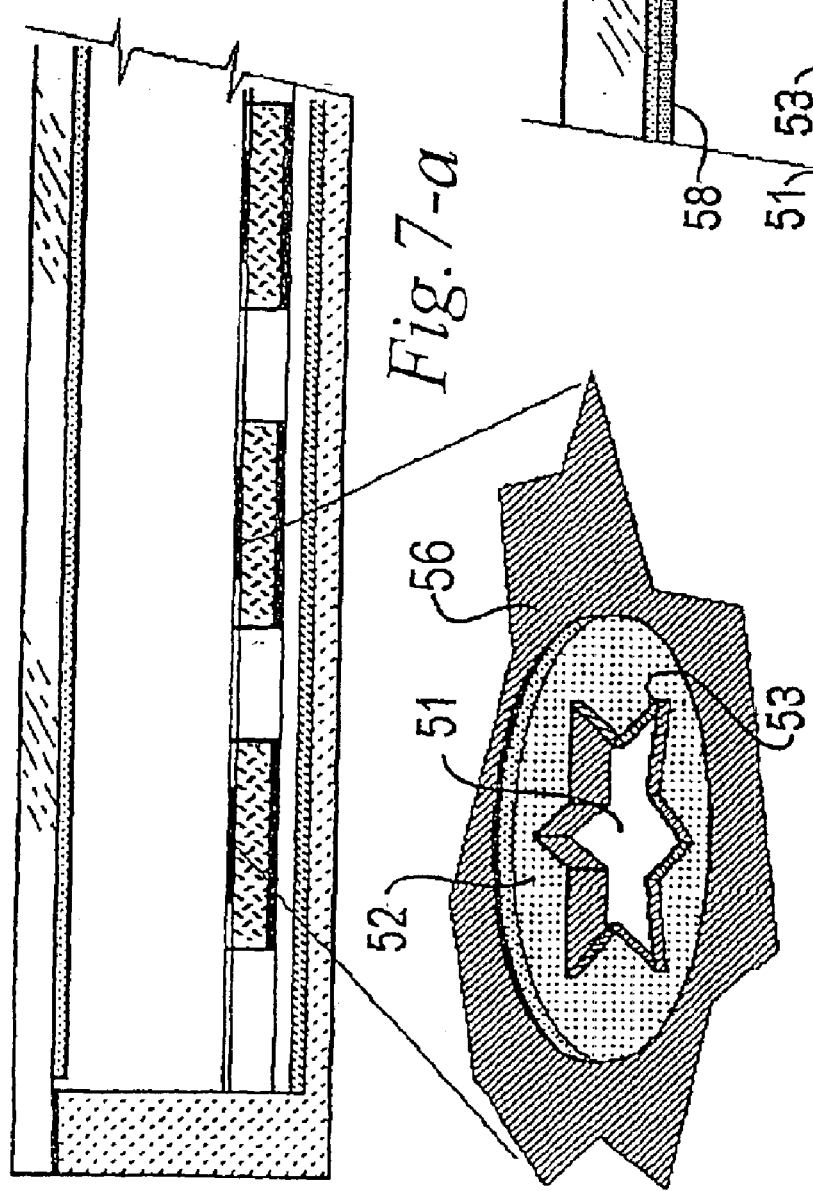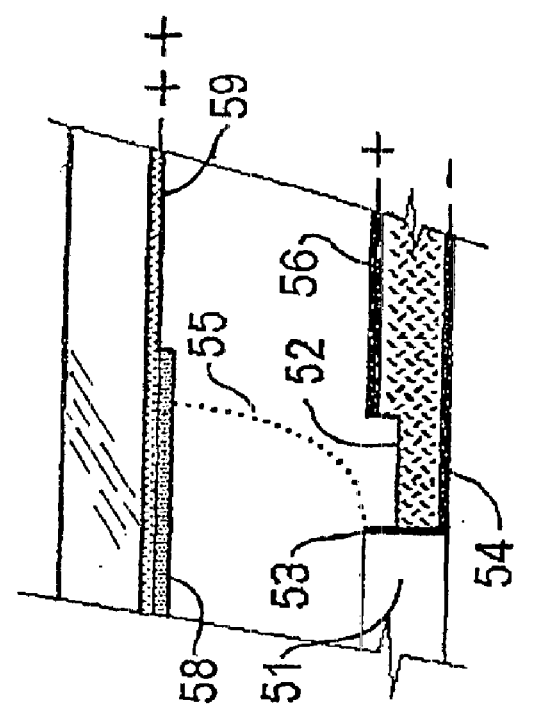

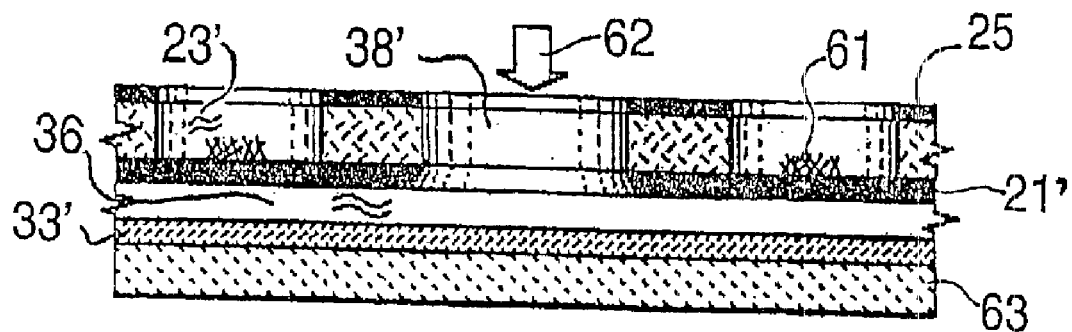
*Fig.10-a*
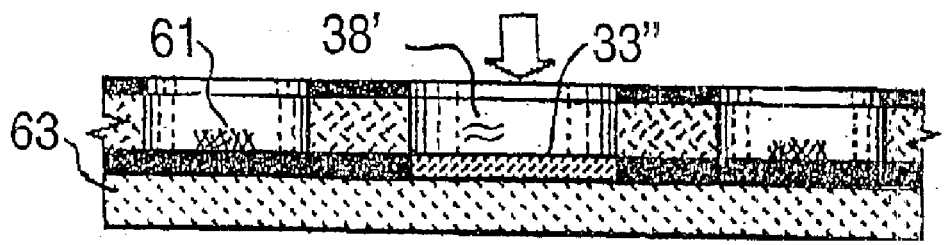
*Fig.10-b*
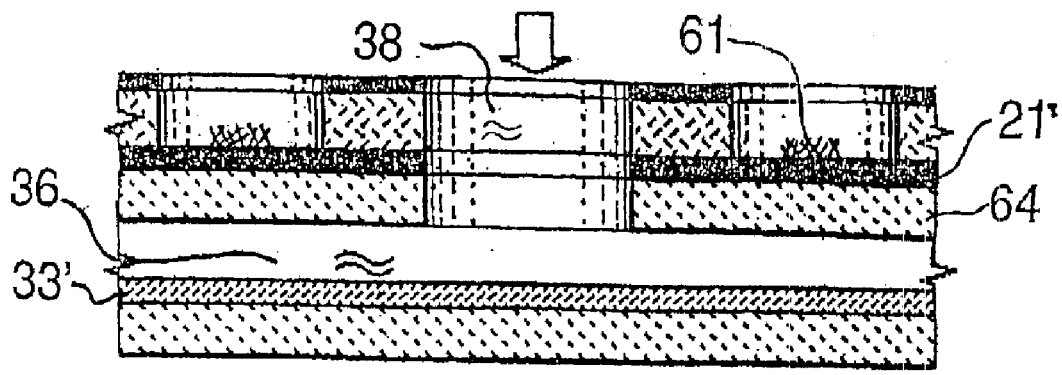
*Fig.10-c*

ELECTRON EMITTER STRUCTURE FOR FIELD EMISSION DISPLAY

BACKGROUND OF THE INVENTION

1. Field of the Invention

The present invention is related to flat panel information displays and, more specifically, to FED (Field Emission Display) devices based on electron emission from sharp conducting objects.

2. Description of the Related Art

It is already known that strong electric fields, in the order of megavolts per centimeter, can be used to provide cold cathode emission from conducting surfaces. It is also well known that when the emitters are shaped as sharp needles or edges, the emission voltage can be reduced to more practical levels, such as a few kilovolts per centimeter.

Such effect can be efficiently used for fashioning electronic devices which operate like electronic valves or, better, as cathode ray tubes, with the advantage of eliminating the cathode heating and saving the power needed when compared to the latter, thus increasing the overall efficiency. Such a device is described in U.S. Pat. No. 3,789,471 which shows structures that function as diodes and triodes, where the cathode is shaped like a sharp tip in which the concentration of the electric field produces cold cathode electron emission. The manufacturing process for such electrodes was first described by Spindt in 1968, hence those electrodes are known as Spindt emitters.[1]

[1] Spindt, C. "A Thin-Film Field Emission Cathode", Journal of Applied Physics, Vol. 39, No. 7, June 1968

As shown in the above mentioned patent document, as well as in U.S. Pat. No. 3,665,241, the electron source comprises a plurality of Spindt emitters, conical or pyramidal, placed over a conducting substrate, with the addition of an accelerating grid-like structure consisting of a conducting foil electrically insulated from the substrate, provided with holes having their centers coinciding with the tips of the Spindt emitters.

The drawings in FIG. 1 show several electron emitting structures: the perspective view in FIG. 1-a and the corresponding cross-section view in FIG. 1-b show an electron emitter structure consisting of pyramidal Spindt emitters 12 where the holes 15 of the grid foil 14 are square shaped. Said pyramidal emitters are placed over a conducting substrate 11, insulated from the grid sheet by an insulating layer 13. The drawings in FIGS. 1-c and 1-d show cone-shaped Spindt emitters 12', the holes 15' in the grid 14' being circular in this case. In both embodiments shown in FIG. 1, the Spindt emitter tips are substantially on the same plane as the upper face of the grid foil 14 or 14'. The drawings also show that in the embodiments of FIGS. 1-a and 1-b, the conducting substrate is self-supported, while in the one shown in FIGS. 1-c and 1-d, the conducting substrate rests upon an insulating base 10.

As described in the aforementioned documents, electrons are emitted when a negative voltage is applied to the substrate 11, the grid foil voltage being positive. The amount of emitted electrons can be controlled by varying the voltage applied to the grid 14 or 14'. The addition of a separating insulator plate 17 and an anode 16, as shown in FIG. 1-e, yields a triode-like structure. A positive voltage, higher than the grid voltage, is applied to this anode. The assembled parts form a gas-tight chamber 18 which is evacuated.

This basic structure can be used for fashioning lighted panels, in which a transparent anode is coated with a layer of luminescent material—"phosphor"—which emits light when struck by electrons, similarly to what happens in a CRT face.

A problem which occurs with devices of this kind lies in the contamination of the vacuum by gas molecules which are gradually released from the material surfaces. Experimental data show that such devices only operate reliably when the gas pressure inside the evacuated chamber is equal or less than $10^{-6}$ torr. With higher pressures, the gas molecules may become ionized; these ions are attracted by and strike the electrically biased surfaces, impairing the emitting structures. Moreover, even when this ionization is absent, gas molecules are adsorbed by the exposed surfaces, modifying the work function of the emitter material and degrading the phosphor layer.

The removal of the molecules from the region in which the electrons travel is achieved by placing inside the evacuated chamber a getter which binds the contaminant gas molecules.

FIG. 2 shows a light emitting display built according to the known technique. Said display comprises a cathode structure composed of a conducting backplate 21 that can be self-supporting or bonded to a rigid insulating slab 20, this backplate being provided with a plurality of Spindt emitters 22 centered at the bottom of through-holes 23 provided in an insulating panel 24 attached to the internal surface of said conducting backplate, the outside surface of said insulating panel being overlaid with a control grid 25 consisting of a conducting foil provided with holes 26 concentric with said through-holes 23 and said emitters 22, the assemblage of the above mentioned elements forming the electron emitting structure or the cathode structure. The display also comprises a rigid transparent front plate 27, usually made of glass, having its internal surface coated with a transparent conducting film 28 (anode); the inside surface of this anode is overlaid with phosphor 29, either as a continuous layer or as a plurality of discrete spots which constitute the picture elements—pixels.

The display shown in FIG. 2 differs from the assembly of FIG. 1-e by the fact that the vacuum chamber comprises the full extension 32 of the device, to allow the displacement, by gaseous diffusion, of the contaminant molecules, from any place in the vacuum chamber to the getter 33 which is placed on a trough 34 provided along one side of the display. This displacement of the gas molecules along the length of the display is called "longitudinal pumping". The spacing elements between the front plate and the cathode structure in the display of FIG. 2 have been omitted in this drawing for clearness sake.

The pixel definition, specially in the case of colored displays, hinges on the production of sharply defined electron beams, because the defocussing of the beam will result in that a part of the electrons will impinge on phosphor spots of different colors than intended. One of the main causes of this defocussing is the distance travelled by the electrons between the tip of the Spindt emitter and the picture element, i.e., the phosphor spot. In displays built according to known techniques, this distance 35 is about one millimeter, resulting in an unacceptable image quality unless complex and expensive additional structures—not shown in the figure—are used to control the scattering of the electron beams. A more straightforward way of lessening said scattering would be to reduce the distance between the emitter structure and the front plate.

However, this reduction will give rise to a pressure gradient along the display's length, impairing the vacuum in the regions of the display farther from the getter. This effect depends on the relation between the display size 32, typically of the order of 10, 20 or more centimeters, and the free gap 35 between the cathode structure and the front plate. An adequate longitudinal pumping will result only when said gap is equal or greater than 1 millimeter. However, as mentioned before, such large distances require the addition of complex and expensive structures, such as the one described in U.S. Pat. No. 6,013,974.

The approximation between the front plate and the cathode structure constitutes a more straightforward solution for the defocussing problem, due to the fact that the reduction of the path traversed by the electrons before impinging in the front plate will reduce the spot illuminated by the electron beam, which will impinge upon one picture element only, doing away with the need for additional focussing means. However, this nearness diminishes the vaccum conductance, hindering the displacement of contaminant gas molecules along the display length, resulting in a residual pressure gradient. This lack of uniformity in the vacuum quality will bring about the deterioration of the emitter elements as well as of the phosphor, which will be more intense on the central part of the display, resulting in a lack of picture uniformity.

SUMMARY OF THE INVENTION

In view of the preceding, therefore, it is the aim of the present invention to produce an uniform vacuum, giving rise to a uniform image quality in the full extension of the display, without recourse to complex and expensive focussing structures.

The above mentioned aim is achieved by the invention by providing a substantially uniform distribution of the getter along the fill extension of the display, the path of the gas molecules toward the getter being substantially perpendicular to the electron emitter structure, said path comprising a plurality of pores uniformly distributed along said structure.

According to another feature of the invention, the depth between the pore front and back openings is smaller than their transverse dimension.

According to another feature of the invention, the getter is placed in a chamber occupying the full extension of the display, said chamber being placed between the rear face of the electron emitting structure and the back closing plate of the display.

According to yet another feature of the invention, the getter is plated over the inside surface of said closing plate.

According to a further feature of the invention, the pore edges are metal plated and function as electron emitters.

The foregoing characteristics, as well as other aspects and advantages of the invention will become more evident from the description of the following embodiments, shown as examples and not in a limiting sense, as depicted in the attached drawings where similar reference numbers identify similar parts.

BRIEF DESCRIPTION OF THE DRAWINGS

FIGS. 1a through 1e show the underlying principles of known Spindt emitters.

FIG. 4 shows a perspective view of the electron emitting structure according to the invention.

FIG. 5 shows a cathode structure of a FED display in which the electrons are emitted by the pore edges.

FIG. 6 shows an alternative arrangement of the electron emitting structure depicted in the previous figure, in which the pore edges are coated with a DLC layer.

FIGS. 7a and 7b show a preferred embodiment for the pore in the shape of a polygon.

FIG. 8 shows a further embodiment of the electron emitting structure.

FIG. 9 shows an alternative distribution of emitter elements and pores.

FIGS. 10a through 10c show further versions of the electron emitting structures in which the electrons are emitted by carbon nanotubes.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 2:
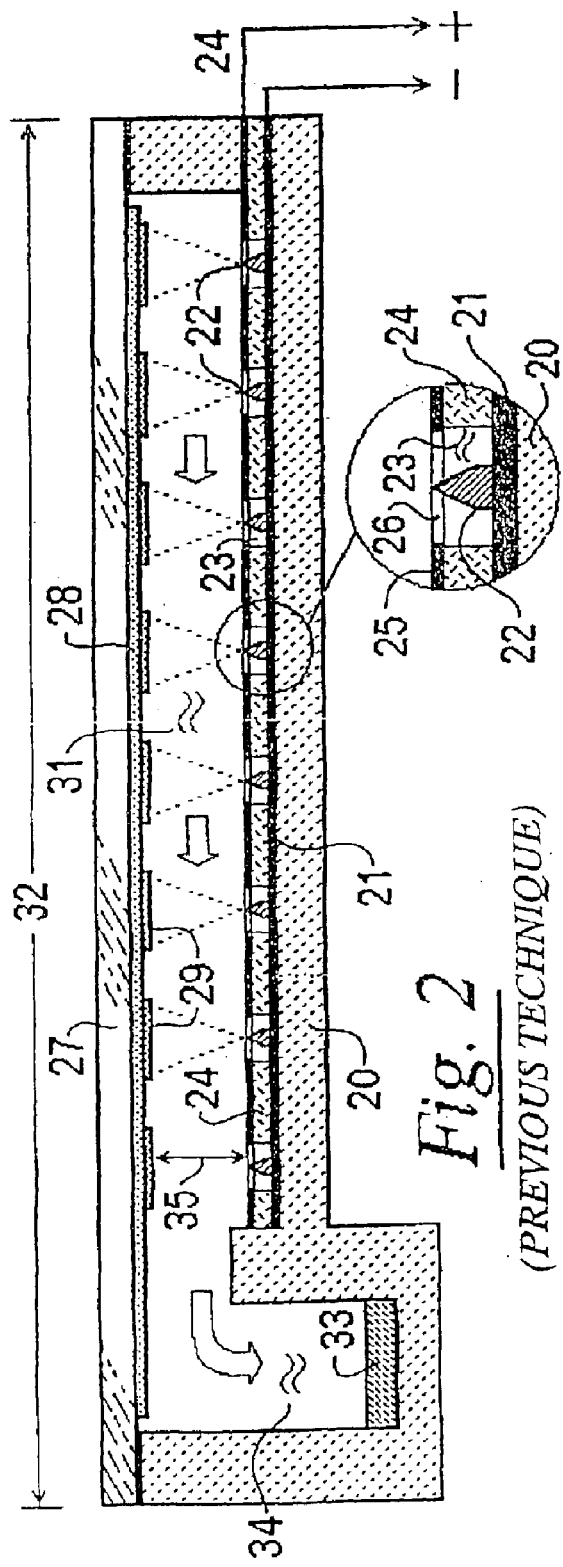
FIG. 2 shows a FED display built according to known techniques.
Figure 3:
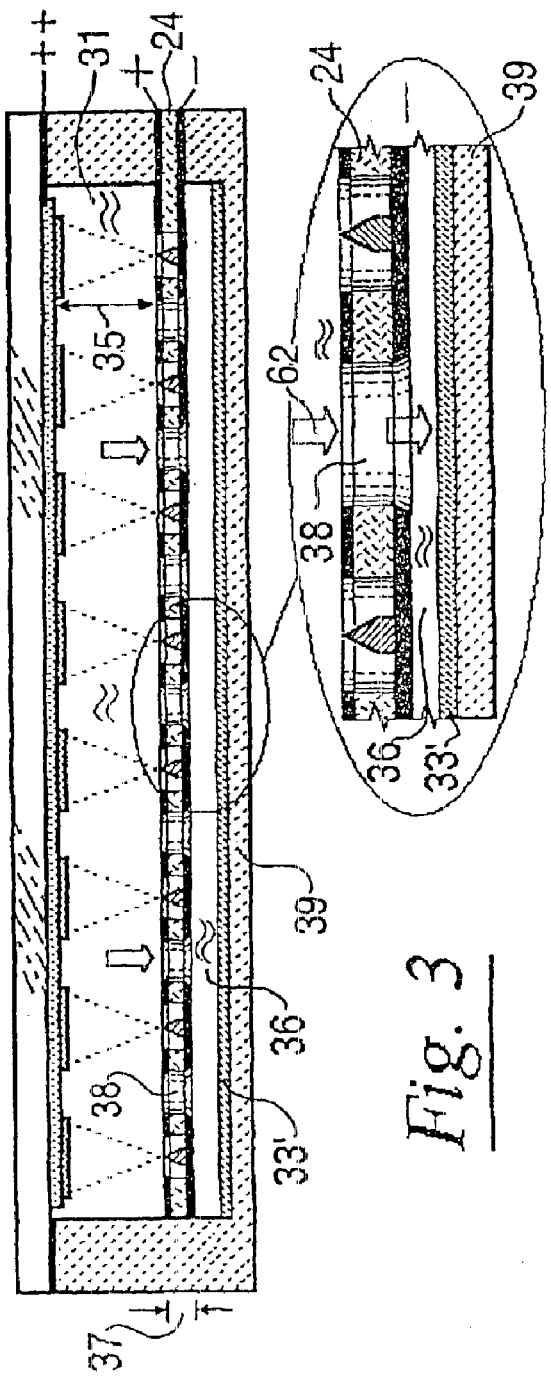
FIG. 3 is a section view of a FED display built according to the invention.

The display built according to the invention, depicted in FIG. 3, comprises a front plate similar to the one in the known display shown in FIG. 2, however it differs from the latter as regards the electron emitting structure 37, as well as the back chamber 36 that spans the full extension of the display. This chamber is positioned between the back of the structure and the inside face of the closing plate 20'. The structure consists of an insulating plate 24 overlaid with metallic conducting layers in both upper and lower surfaces. The material of the plate is polymer that can be engraved by photo-etching or plasma etching process, such as polyimide or SU8.

As shown in the detailed view of FIG. 3, the insulating plate is provided with a plurality of through holes or pores 38, allowing the contaminating gas molecules to pass freely from the vacuum chamber 31 to the getter layer 33' that coats the inside surface of the back closing plate 39. This molecular diffusion proceeds in a direction perpendicular to the plane of the display, as shown by the arrows 62, being called "transverse pumping". It should be noted that, in the present case, the path traversed by the gas molecules to reach the getter is much shorter than in the case of longitudinal pumping, the vacuum conductance being, therefore, correspondingly larger. Moreover, with the arrangement shown in FIG. 3 the vacuum conductance is not affected by the gap 35 between the cathode structure 37 and the front plate; therefore, this distance can be reduced as required to avoid defocussing of the electron beams due to scattering.

FIG. 4 shows a perspective view of the display built according to the invention, with the front plate removed. As depicted, the pores 38 are interspersed with the Spindt emitters 22, the getter layer 33' being visible through said pores.

Notwithstanding the fact that FIGS. 3 and 4 show pores and Spindt emitters in roughly the same quantities, this relation can be changed as needed by circumstances. Although the drawings depict said elements as being about the same size, in practical devices the emitters are substantially smaller than the pores. Typical Spindt emitters measure about 1 micrometer, while the pore diameters are on the order of tens of micrometers. Therefore, cathode structures such as shown in FIG. 9 can be fashioned, in which each pore 38 corresponds to a group 22' comprising several Spindt emitters, without overstepping the bounds of the invention.

In a second embodiment of the inventive concept, depicted in FIG. 5, the electrons are not emitted by Spindt elements but by the sharp edges 41 of the metallic plating that, besides covering the lower surface of insulating plate 45, extends in the upper direction covering the pore walls 43 and reaching the upper surface of said insulating plate. This embodiment has the favorable feature of increasing the size of the region of high electric field concentration, i.e., the region from which the electrons are emitted. Indeed, said emission can take place along the full edge of the pore wall plating, while in a Spindt device the electrons issue only from the tip of the cone or pyramid. To insure that emission occurs along the whole perimeter of the pore edge, said edge can be serrated, so that a large number of sharp tips are available for electron emission.

FIG. 6 shows an arrangement similar to the one of the preceding drawing, however in this case the emitting edge 41 is overlaid with a membrane 44 of DLC (diamond-like carbon). This layer, which in practice ranges between 5 and 50 nanometers thick, reduces the work function at the metal surface, facilitating the electron emission from said pore edges.

The pore shape is not restricted to a circle, as shown in FIG. 4. Actually the pores can be shaped as ovals, polygons or slits, provided the distance between the side walls is greater than the depth measured between the upper and lower openings. A specially effective shape is that of a polygon having alternately outward and inward angles, such as, for example, in the polygons that satisfy Jordan's theorem.

The drawings in FIGS. 7a and 7b show a triode type electron emitting structure, in which each emitting pore 51 has the shape of a 6-point star. As depicted, the pore lies substantially at the center of a circular depression 52 in the insulating plate 57. In case of irregular or asymetric pores, the depression will be proportionately shaped. As shown in the detailed view of FIG. 7b, the depression 52 lies between the edge of the metal-clad upper surface 56 of the insulating plate 57 and the electron emitting elements, which happen to be the star points 53. As is the case with the structures shown in FIGS. 5 and 6, the conducting foil 54 which covers the insulating plate lower face extends upwards into the pore 51 side walls and reaches the bottom plane of the depression 52. The foil may consist of a metal such as copper, molybdenium, tungsten, etc. The electron emission can be facilitated by plating the emitter points 54 with DLC or with a low-work-function material, such as a boron compound.

As shown in FIG. 7-b, the lower conducting foil 54 is connected to the (−) pole of a power supply. The upper foil 56, which functions as the control grid, is connected to the (+) pole of the same power supply, the emitting elements being negatively biased relative to the grid. The brightness of the light emitted by the phosphor layer 58 depends on the electron kinetic energy, which is a function of the accelerating voltage applied to the transparent conducting anode 59 overlying the internal face of the front plate 57. This accelerating voltage (++) is equal or greater than 3 kV, which is much higher than the control grid voltage, typically 100 volts.

In a triode arrangement such as the one shown in FIG. 7, the voltage between the electron emitting element and the control grid may be varied with the purpose of controlling the electron beam intensity and thus the brightness of the illuminated spot. This control is made possible by the fact that the distance between the emitter tip 53 and the edge of the grid layer 56 is much smaller than the distance between the electron emitting structure and the transparent conducting layer 59—the anode—which overlays the front plate 57. Typical values are 2 micrometers for the first distance and 300 micrometers for the second, wherefore the electrons emitted by the tips 53 travel along a parabola-like path 55, starting toward the grid and gradually veering toward the anode due to its stronger electric field.

In all the embodiments of the invention, the electron emission is stabilised by placing a resistance in series with each electron emitting element. The resistances are omitted in the drawings for clarity's sake.

In another embodiment of the invention, the back chamber 36 is eliminated by placing the back closing plate 20' flush against the rear face of the electron emitting structure, such as depicted in FIG. 8. In this case, the pore will be shaped as a shallow well, in which the bottom opening is closed by the rear continuous metallic layer 21' sandwiched between the insulating plate 24 and the back closing plate 20'. Thus, as depicted in FIG. 8, the getter 33" will overlie only the exposed portion of the metallic layer that closes the bottom opening of pore 38'. It should be stressed that, while the embodiment shown in FIG. 8 shows Spindt emitters, the same basic idea is suitable for embodiments employing pores with emitting edges such as, but not limited to, the ones depicted in FIGS. 5, 6, 7a and 7b.

In a second set of alternative embodiments of the invention, the Spindt emitters are substituted by clumps of carbon nanotubes, which also emit electrons at room temperature. The embodiments employing carbon nanotubes are shown in FIGS. 10a, 10b and 10c. The first two of these are equivalent to the electron emitting structures of FIGS. 3 and 8, while the embodiment depicted in FIG. 10c differs from the previous ones by having a self-supporting insulating backing plate 64 under the rear continuous metallic layer 21' over which are placed the carbon nanotube disk-like clumps 61. This latter structure can also be used with Spindt emitters. In all cases, the pores 38' are interspersed with the electron emitting elements, to provide a path that allows the contaminating gas molecules to reach the getter layer 33'.

The carbon nanotubes can also be used in conjunction with edge emitting pores, in which case the nanotubes will be applied in a layer over the metallic edge bordering the pores.

As mentioned previously, each electron emitting element has a ballast resistance connected in series for emission stabilisation purposes, the electron emitting element being either a Spindt emitter, the pore metallic edge or a clump of carbon nanotubes. When emitting pores are used, the resistance can be provided by reducing the cross-section of the metallic plating on the pore walls.

Two kinds of biasing setups can be used in FED display devices having electron emitting structures that use carbon nanotubes, such as the ones shown in the drawings of FIGS. 10a, 10b and 10c. In the first, the carbon nanotubes are negatively biased, the grid layer 25 has a small positive bias and the anode is strongly positive. In the second biasing setup, the nanotubes are positive, the grid is negative and the anode is strongly positive.

Additional advantages of the present invention will readily occur to those skilled in the art while keeping within the conceptual bounds of the invention. For instance, although the front plate is depicted as being coated on the inside with the transparent anode and the phosphor overlaying said anode, the placement of these layers can be reversed, as is the usual practice in TV picture tubes. In such case, the phosphor layer is applied directly over the inside surface of the front plate and the anode consists of a thin reflecting aluminum film placed over the phosphor layer. This setup increases the image brightness and contrast due to the reflection of the light emitted in the backward direction by said aluminum layer.

Therefore, in consideration of the preceding, the spirit and scope of the invention are limited and defined by the appended claims.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. Electron emitter structure for field emission display, said display including a tabular vacuum chamber confined between a rigid transparent front plate internally overlaid with a transparent conducting anode and a substantially flat electron emitting structure provided with electron-beam emitting means and electron-beam current intensity control means, said structure comprising a substantially flat insulating substrate having a first surface facing said front plate, and a second surface, on an opposite side, facing a getter distributed substantially uniformly over said display area, the passage of the residual contaminant gas molecules from said chamber to said getter being mediated by a multitude of pores distributed substantially uniformly over said insulating substrate, wherein said insulating substrate's second surface, facing said getter, is overlaid with a first conducting foil which is kept at a negative potential to in relation to said anode, said foil extending uninterrupted into at least some of said pores plating their side walls, the distal edges of said plating terminating substantially at the rims of said pores, the edges of said pore-like apertures not exceeding the plane of said first surface.

2. Electron emitter structure for field emission display as claimed in claim 1, wherein said electron-beam current intensity control means are provided by a second conducting foil overlaying said first surface of said insulating substrate, said second foil being provided with holes encompassing said pores leaving an exposed extent of insulating substrate between the rim of each pore-like aperture and the edge of the second foil, said second foil being connected to a biasing voltage power supply.

3. Electron emitter structure for field emission display as claimed in claim 2, wherein the exposed extent of substrate left uncovered by said second conducting foil overlying said first surface forms a shallow depression bordering the rim of said pores, the edge of said second conducting foil being terminated at the upper lip of said depression.

4. Electron emitter structure for field emission display as claimed in claim 1, wherein said insulating substrate is a polymer engravable by photo-etching process.

5. Electron emitter structure for field emission display as claimed in claim 1, wherein said insulating substrate is a polymer engravable by plasma-etching process.

6. Electron emitter structure for field emission display as claimed in claim 4, wherein said polymer consists of polyimide.

7. Electron emitter structure for field emission display as claimed in claim 4, wherein said polymer consists of SU8.

8. Electron emitter structure for field emission display as claimed in claim 1, wherein said pores have their cross-section in the shape of a polygon that satisfies Jordan's theorem.

9. Electron emitter structure for field emission display as claimed in claim 8, wherein said pores have their cross-section formed as a star-shaped polygon.

10. Electron emitter structure for field emission display as claimed in claim 1, wherein said distal terminating edges of the side walls plating of said pores are overlaid with diamond-like carbon (DLC).

11. Electron emitter structure for field emission display as claimed in claim 1, wherein said distal terminating edges of the side walls plating of said pores are overlaid with a low-work-function material.

12. Electron emitter structure for field emission display as claimed in claim 11, wherein said low-work-function material is a boron compound.

13. Electron emitter structure for field emission display as claimed in claim 1, wherein said distal terminating edges of the side walls plating of said pore-like apertures are overlaid with carbon nanotubes.

14. Electron emitter structure for field emission display as claimed in claim 1, wherein in said the depth between the entrance and the exit openings is smaller than the transverse dimension.

15. Electron emitter structure for field emission display comprising an insulating substrate with a first surface facing a tabular vacuum chamber and a second surface facing getter material distributed substantially uniformly over an area equivalent to the area of said electron emitter structure, said getter material absorbing contaminant gas molecules contained in said tabular vacuum chamber, wherein the travel path between said vacuum chamber and said getter material includes a first plurality of pores having the depth between the entrance and exit openings smaller than their transverse dimension, and said membrane-like insulating substrate is overlaid on both faces with conducting foils.

16. Electron emitter structure for field emission display as claimed in claim 15, wherein said first plurality of pores are provided with electron emitting means consisting of the distal terminating edges of the side-walls' conductive plating which is electrically contiguous with the conducting foil facing said getter material.

17. Electron emitter structure for field emission display as claimed in claim 15, wherein said electron emitter structure comprises additionally a second plurality of pores provided with electron emitting means.

18. Electron emitter structure for field emission display as claimed in claim 17, wherein said electron-emitting means are provided by the distal terminating edges of the conducting plating of said pores' side walls, said plating being continuous with the conductive foil overlaying said second surface of said insulating substrate.

19. Electron emitter structure for field emission display as claimed in claim 17, wherein said second plurality pores are shaped as wells which have their bottoms closed by an unbroken extension of the conductive foil overlaying said substrate's second surface, the electron emitting means being placed at the bottom of said wells in electrical contact with said conductive foil.

20. Electron emitter structure for field emission display as claimed in claim 19, wherein said electron emitting means are provided by Spindt emitters.

21. Electron emitter structure for field emission display as claimed in claim 19, wherein said electron-emitting means are provided by clumps of nanotubes.

22. Electron emitting structure for field emission display as claimed in claim 1, wherein a ballast resistance is provided in series with each electron-emitting element.

23. Electron emitting structure for field emission display as claimed in claim 22, wherein said ballast resistance is provided by reducing the thickness of the conductive plating of the side walls of said pores.

* * * * *

UNITED STATES PATENT AND TRADEMARK OFFICE
CERTIFICATE OF CORRECTION

PATENT NO.    : 6,876,141 B2                                            Page 1 of 1
DATED         : April 5, 2005
INVENTOR(S)   : Aristides Pavani Filho et al.

It is certified that error appears in the above-identified patent and that said Letters Patent is hereby corrected as shown below:

<u>Title page,</u>
Item [57], ABSTRACT,
Lines 1 and 2, change "display, a tabular" to -- display, the display including a tabular --.

<u>Column 3,</u>
Line 32, change "along the fill extension of the display" to -- along the full extension of the display --.

<u>Column 7,</u>
Line 34, change "foil which is kept at a negative potential to in relation to said" to -- foil which is kept at a negative potential in relation to said --.

Signed and Sealed this

Third Day of January, 2006

JON W. DUDAS
*Director of the United States Patent and Trademark Office*